Aug. 21, 1923.    1,465,824
F. W. HODGES
APPARATUS FOR APPLYING RUBBER OUTSOLES TO SHOES
Filed June 14, 1920    2 Sheets-Sheet 2
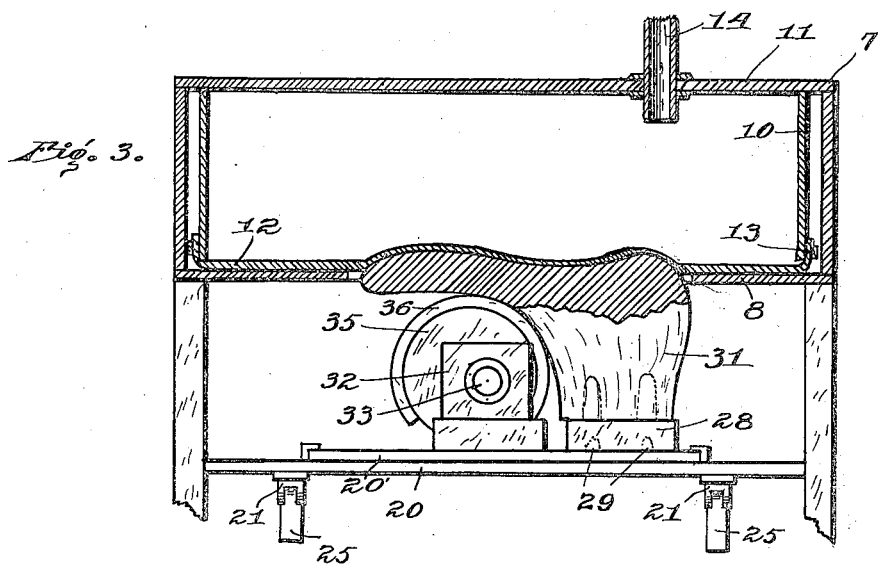
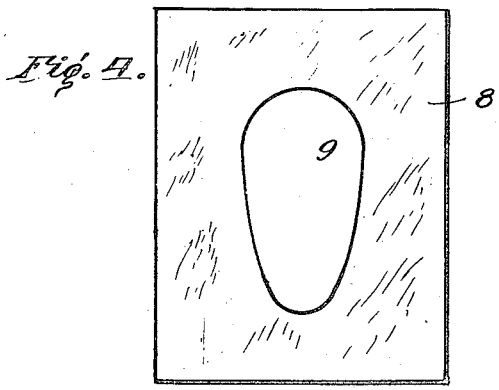
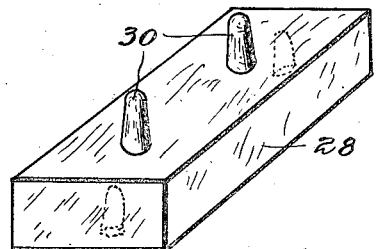
INVENTOR.
Frank W. Hodges.
BY
Francis H Caskin
ATTORNEY.

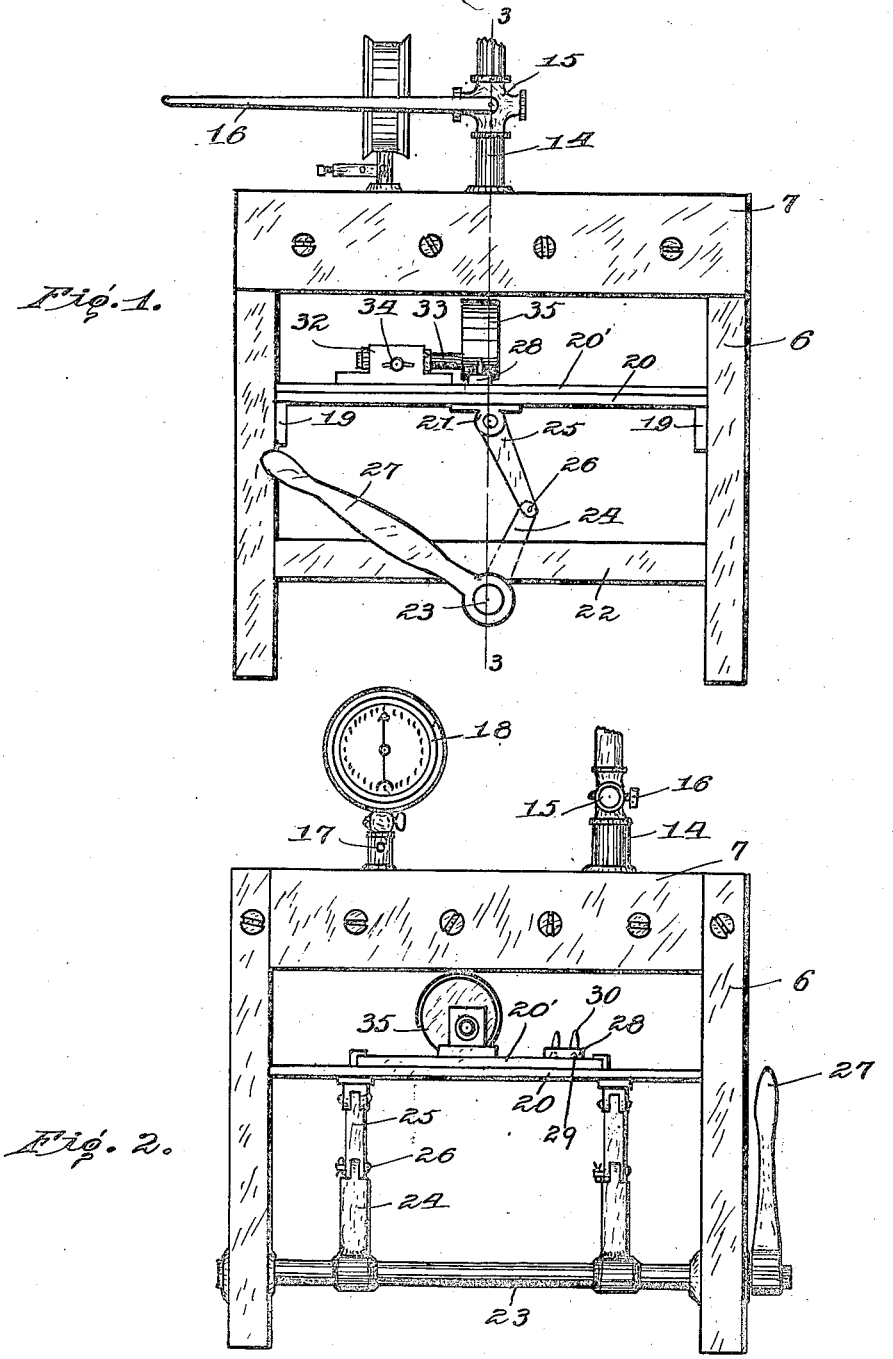

Patented Aug. 21, 1923.

1,465,824

UNITED STATES PATENT OFFICE.

FRANK W. HODGES, OF MALDEN, MASSACHUSETTS, ASSIGNOR TO CONVERSE RUBBER SHOE COMPANY, OF MALDEN, MASSACHUSETTS, A CORPORATION OF MASSACHUSETTS.

APPARATUS FOR APPLYING RUBBER OUTSOLES TO SHOES.

Application filed June 14, 1920. Serial No. 388,804.

*To all whom it may concern:*

Be it known that I, FRANK W. HODGES, a citizen of the United States, and a resident of Malden, county of Middlesex and Commonwealth of Massachusetts, have invented certain new and useful Improvements in Apparatus for Applying Rubber Outsoles to Shoes, of which the following is a specification.

In the ordinary process of applying or attaching rubber out-soles to shoes made of rubber or similar material it is customary to use an out-sole of green or uncured rubber properly cut and prepared. The shoe, if of rubber, rubberized fabric or similar material is likewise uncured. The shoe is placed upon the last and the out-sole laid over it. The out-sole is then firmly attached to the shoe by pressure or pounding by means of a hand roller or similar device. In this way pressure is applied to all parts of the surface of the out-sole forcing it into engagement with the shoe. The edge of the out-sole is then rolled on to the upper of the shoe and the seam covered by means of an edging produced by running a roller around the edge of the out-sole where it comes in contact with the shoe. This operation of attaching the out-sole to the shoe is slow and susceptible to variation dependent upon the skill of the operator.

My present invention relates to the mode of applying a complete out-sole to a rubber or other shoe and seaming or setting the edge of the out-sole to the shoe.

It is the principal object of my invention to provide a smooth and uniform out-sole to a rubber shoe or other shoe, the rubber out-sole having been previously calendered and cut or prepared in any suitable manner.

A further object of my invention is to rapidly and effectively apply a rubber outsole to a rubber shoe in a minimum space of time and without the necessity of treatment by hand or carrying out the steps by hand.

The above and additional objects of a similar nature, which will be hereinafter more specifically treated, may be accomplished by such means as are illustrated in the accompanying drawings, described in the following specification and more particularly pointed out in the claims which are appended hereto and form a part of this application.

In the drawings:—

Fig. 1 is a side view of an embodiment of my invention,

Fig. 2 is a front view thereof,

Fig. 3 is a fragmental vertical cross section taken along the line 3—3 of Fig. 1, Fig. 4 is a view of the templet, and Fig. 5 is a perspective view of the last-holding block.

As illustrated in the drawings, the frame 6 supports, at its upper end, a boxing 7. The bottom of the boxing 7 is formed of a metal plate 8 containing a central opening 9 conforming generally to the horizontal outline of a shoe although of considerably larger dimensions.

Within the boxing 7 are four vertical walls 10 extending from the top 11 to within a short distance of the bottom plate 8. A flexible rubber diaphragm 12 extends across the bottom edges of the walls 10 to which it is hermetically attached, as at 13.

The top 11 of the box 7 has mounted thereon an inlet pipe 14 having a suitable valve 15 operated by a lever 16. Also mounted upon the top 11 is a pipe 17 carrying a pressure gage connected to the interior of the chamber formed by the walls 10 and the diaphragm 12. The pipe 14 is connected to a suitable supply of compressed air. The frame-work 6 carries vertical slide-ways 19 on opposite sides. Vertically movable along slide-ways 19 is a carriage 20 having a bearing 21. A frame 20' is slidably movable upon the carriage. Cross pieces 22 of the frame 6 carry journaled therein transverse shaft 23 having an upwardly extending link 24. The bearing 21 on stand 20 carries a similar depending link 25. The adjacent ends of the links 24 and 25 are connected by a pin 26. A suitable handle 27 forms part of the transverse shaft 23.

The carriage frame 20' has mounted upon it a stand 28 to which it is connected by means of the pins 29. The stand 28 has one or more pins 30 mounted in its top surface and adapted to receive a last 31 with a shoe carried thereby. A journal 32 is mounted upon the carriage frame 20', and serves to hold a transverse shaft 33 which is locked in adjusted position in the journal by the winged-bolt 34. The transverse shaft 33 carries a cam 35 covered with a flexible pad 36 of rubber, leather or similar material.

In operation the handle 27 is raised releasing the toggle links 24 and 25 and lowering the carriage 20. A last 31 carrying a shoe to which an out-sole is to be applied is placed upon the stand 28 of the carriage frame 20'. The cam 35 is set in adjusted position to properly support the last and shoe and locked in such position. A suitably prepared out-sole is placed upon the shoe and brought into registering position.

The lever 27 is now depressed straightening out the toggle links 24 and 25 and raising the carriage 20 and its associated parts. This brings the last together with the shoe and out-sole into the space as provided in the metal plate 8. With the carriage and last in elevated position lever 16 is operated to admit compressed air to the chamber formed by the walls 10 and diaphragm 12. The pressure of the air serves to distend the diaphragm until it comes in contact with the metal plate. That portion of the diaphragm which is opposite the space 9 is distended through this space and contacts tightly with the upper surface of the out-sole and the adjoining portions of the shoe, which is upon the last. Pressure is admitted to the amount desired and as indicated to be proper in the pressure-gage 18.

The diaphragm forced into contact with the surface of the out-sole and bringing the latter tightly against the bottom of the shoe serves to firmly attach the out-sole to the latter and sets the edge to the upper of the shoe. The machine is held in this position a sufficient length of time to accomplish the firm attachment between the out-sole and the shoe. The air pressure is then released from the chamber and the diaphragm returns to its normal position. The lever 27 is then raised, serving to lower the carriage 20 and bring the last together with the shoe and applied out-sole into position to be removed and replaced by another last. The operation may then be repeated and outsoles applied to the shoes in rapid, uniform and efficient manner.

In the event that the successive articles operated upon are all of uniform size one setting of the cam 35 will generally be sufficient. But it will be apparent to those skilled in the art that different sized lasts and shoes may be operated upon by readily adjusting the cam 35, to provide the requisite support.

It has been found that by means of the mechanism above described it is possible in one operation to secure an out-sole upon a shoe in a firm and positive manner in which the attachment is uniform throughout. The pressure applied against the out-sole is uniform and no lateral distortion is caused nor is the material stretched. As the operation is carried out simultaneously over the entire surface of the sole it is found that the time required in the operation can be materially lessened, with a resultant increase in the amount of work accomplished.

The particular embodiment of my invention shown is of course susceptible to considerable variation without departing from the spirit of my invention and it is to be understood that many changes may be made by those skilled in the art within the scope of the invention as defined by the appended claims.

What I claim is:

1. In a machine of the class described, a diaphragm, a flat shield therefor, apertured to conform closely to the contour of a shoe, a carriage, means to carry a last upon said carriage, means to position the carriage with the last adjacent the aperture of the shield, and means to distend the diaphragm through the aperture of the shield and thereby apply pressure around the said last.

2. In a machine of the class described, a diaphragm, a flat apertured shield therefor, a carriage, means to carry a last upon said carriage, means to position the carriage with the last adjacent the aperture of the shield, and means to distend the diaphragm through the aperture of the shield and thereby apply pressure around the said last.

3. In a machine of the class described, a flexible diaphragm, a flat apertured shield parallel thereto, a carriage, means to carry a last upon said carriage, means to position the carriage with the last within the aperture of the shield, and means to distend the diaphragm through the aperture of the shield and thereby apply pressure around the said last.

4. In a machine of the class described, a flexible diaphragm, a flat apertured shield parallel thereto, a carriage, means to carry a last upon said carriage, means to position the carriage with the last within the aperture of the shield, and means to distend the diaphragm through the aperture of the shield and thereby to exert pressure on the base and sides of the last.

In testimony whereof, I have hereunto affixed my signature.

FRANK W. HODGES.